United States Patent
Lo

(10) Patent No.: US 11,574,745 B2
(45) Date of Patent: Feb. 7, 2023

(54) SYSTEM AND METHOD FOR ENERGY CONVERSION USING AN ANEUTRONIC NUCLEAR FUEL

(71) Applicant: Austin Lo, Traverse City, MI (US)

(72) Inventor: Austin Lo, Traverse City, MI (US)

(*) Notice: Subject to any disclaimer, the term of this patent is extended or adjusted under 35 U.S.C. 154(b) by 97 days.

(21) Appl. No.: 17/027,422

(22) Filed: Sep. 21, 2020

(65) Prior Publication Data

US 2022/0093281 A1    Mar. 24, 2022

(51) Int. Cl.
| | | |
|---|---|---|
| *G21C 3/40* | (2006.01) | |
| *G21H 1/00* | (2006.01) | |
| *G21D 7/00* | (2006.01) | |
| *G21C 3/04* | (2006.01) | |
| *G21C 3/58* | (2006.01) | |

(52) U.S. Cl.
CPC ............ *G21C 3/40* (2013.01); *G21D 7/00* (2013.01); *G21H 1/00* (2013.01); *G21C 3/04* (2013.01); *G21C 3/58* (2013.01)

(58) Field of Classification Search
CPC .......... G21C 3/40; G21C 3/04; G21C 17/102; G21H 1/00; G21D 7/00
USPC ................................................. 376/320, 321
See application file for complete search history.

(56) References Cited

U.S. PATENT DOCUMENTS

| | | |
|---|---|---|
| 3,022,240 A | 2/1962 | Bassett |
| 3,147,191 A | 9/1964 | Crowther |
| 3,228,849 A | 1/1966 | Fellows |
| 3,480,803 A | 11/1969 | Jamerson et al. |
| 3,660,230 A | 5/1972 | Bailey, Jr. et al. |
| 3,672,642 A | 6/1972 | Beisswenger |
| 4,367,196 A | 1/1983 | Wende et al. |
| 6,271,529 B1 * | 8/2001 | Farley ............ H05H 3/02 250/251 |
| 9,190,177 B2 | 11/2015 | Ahlfeld et al. |
| 10,163,537 B2 | 12/2018 | Hamilton |
| 2006/0150611 A1 | 7/2006 | Allen |
| 2007/0148522 A1 | 6/2007 | Cordelle et al. |
| 2008/0057370 A1 | 3/2008 | Lee |

(Continued)

FOREIGN PATENT DOCUMENTS

| | | |
|---|---|---|
| AU | 254709 B | 1/1964 |
| GB | 817754 A | 8/1959 |

(Continued)

OTHER PUBLICATIONS

Dwyer, "Spectral structure of electron antineutrinos from nuclear reactors", Physical review letters 114, No. 1 (2015): 012502. (Year: 2015).*

(Continued)

*Primary Examiner* — Jack W Keith
*Assistant Examiner* — Daniel Wasil
(74) *Attorney, Agent, or Firm* — Miller Johnson

(57) ABSTRACT

A nuclear fuel includes a net neutron-producing material, a neutron-consuming material, and a neutron-moderating material. Upon exposure of the net-producing material, the neutron-moderating material, and the neutron-consuming material to a neutron source, a ratio of the net neutron-producing material to the neutron-consuming material and a ratio of the net neutron-producing material to the neutron moderating material are operable to convert neutrons into charged particles without producing net neutrons.

5 Claims, 3 Drawing Sheets

(56) References Cited

U.S. PATENT DOCUMENTS

| | | | |
|---|---|---|---|
| 2013/0059226 A1 | 3/2013 | Gomi et al. | |
| 2014/0116490 A1* | 5/2014 | Morgan | G21H 1/00 |
| | | | 429/416 |
| 2015/0078504 A1 | 3/2015 | Woolley | |
| 2015/0110237 A1 | 4/2015 | Cox et al. | |
| 2015/0194229 A1 | 7/2015 | Schenter et al. | |
| 2015/0228363 A1 | 8/2015 | Dewan et al. | |
| 2017/0133956 A1 | 5/2017 | Landa et al. | |
| 2017/0301422 A1 | 10/2017 | Kitto et al. | |
| 2018/0068746 A1 | 3/2018 | Wong et al. | |
| 2019/0371582 A1 | 12/2019 | Clark et al. | |
| 2020/0274045 A1 | 8/2020 | Birmingham | |

FOREIGN PATENT DOCUMENTS

| | | |
|---|---|---|
| GB | 847902 A | 9/1960 |
| GB | 850876 A | 10/1960 |
| GB | 905559 A | 9/1962 |
| GB | 1018828 A | 2/1966 |
| JP | 2019174429 A | 10/2019 |
| JP | 2020522681 | 7/2020 |
| KR | 1215115 B1 | 12/2012 |
| WO | 2014204531 A2 | 12/2014 |
| WO | 2015160407 A2 | 10/2015 |
| WO | 2018204470 | 11/2018 |

OTHER PUBLICATIONS

Kopeikin, "Inverse beta decay in a nonequilibrium antineutrino flux from a nuclear reactor", Physics of Atomic Nuclei 64, No. 5 (2001): 849-854. (Year: 2001).*

Huber, "Determination of antineutrino spectra from nuclear reactors", Physical Review C 84, No. 2 (2011): 024617. (Year: 2011).*

Algora, "Total absorption study of beta decays relevant for nuclear applications and nuclear structure", Nuclear Data Sheets 120 (2014): 12-15. (Year: 2014).*

Korean Intellectual Property Office as ISA, International Search Report and Written Opinion for PCT App. No. PCT/US2021/049330, dated Dec. 23, 2021.

USPTO, Non-Final Office Action for U.S. Appl. No. 17/202,952, dated Apr. 28, 2022.

Korean Intellectual Property Office, International Search Report and Written Opinion for PCT/US2021/060350, dated Mar. 15, 2022.

Kamarul Aizat Abdul Khalid et al., Review on Thermionic Energy Converters, IEEE Transactions of Electron Devices, Apr. 29, 2016, vol. 63, No. 6, pp. 2231-2241.

Tilghman, Using Nuclear Waste Heat as Power Source, Submitted as coursework for PH241, Stanford University, Winter 2012 [online], Mar. 19, 2012.

Korean Intellectual Property Office, International Search Report and Written Opinion for PCT/US2022/016057, dated Jun. 9, 2022.

* cited by examiner

SYSTEM AND METHOD FOR ENERGY CONVERSION USING AN ANEUTRONIC NUCLEAR FUEL

FIELD

The present disclosure relates generally to an aneutronic nuclear fuel for direct conversion of heat to electric energy.

BACKGROUND

This section provides background information related to the present disclosure and is not necessarily prior art.

The potential low operational costs and overall economic competitiveness of nuclear power is marginalized by the use of traditional, dynamic heat to electric energy conversion methods. The use of these auxiliary systems causes traditional power plants to suffer significant operational and maintenance costs, which lowers the economic effectiveness and efficiency of such plants. One alternative to cumbersome dynamic heat to electric energy conversion systems is Thermionic Energy Conversion (TEC)—a direct heat to electric energy conversion process which generates electricity from thermionic emission. TEC provides an opportunity for low maintenance, autonomous electrical power generation and illustrates the potential for economically competitive advanced nuclear reactors.

Some examples of TEC systems utilize an interelectrode plasma to conduct thermionically-emitted electrons from a "hot" side (i.e., an emitter) of the system to a "cold" side (i.e., a collector) of the system. Though all demonstrable TEC systems use emitted electrons to ionize a plasma of low ionic potential (e.g., cesium), this method limits device efficiency. Previous efforts explored using fission fragments from an unclad fuel element to ionize the interelectrode plasma. However, these previous efforts required enough fuel to sustain a chain reaction, i.e. for a critical system.

SUMMARY

This section provides a general summary of the disclosure, and is not a comprehensive disclosure of its full scope or all of its features.

One aspect of the disclosure provides an aneutronic nuclear fuel. The nuclear fuel includes a net neutron-producing material, a neutron-consuming material, and a neutron moderating material. Upon exposure of the net neutron-producing material, the neutron-moderating material, and the neutron-consuming material to a neutron source, a ratio of the net neutron-producing material to (i) the neutron-consuming material and (ii) the neutron-moderating material is operable to convert neutrons into charged particles without producing net neutrons.

Implementations of this aspect of the disclosure may include one or more of the following optional features. In some implementations, the net neutron producing material is fissile. In some examples, the net neutron-producing material is fertile. Optionally, the net neutron-producing material may undergo fission. In some implementations, the neutron-consuming material undergoes neutron activation. In some examples, the neutron-consuming material undergoes neutron activation in a beta decay process. In some implementations, the ratio of the neutron-producing material to the neutron-consuming material is able to produce charged particles to ionize a plasma.

Another aspect of the disclosure provides a method of generating electricity. The method includes, producing a plurality of neutrons with a first material, and consuming at least one of the plurality of neutrons with a second material. The method also includes moderating a quantity of the plurality of neutrons with a third material, and exposing the first material, the second material, and the third material to a neutron source.

This aspect may include one or more of the following optional features. In some implementations, the first material is fissile. In some examples, the first material is fertile. Optionally, the first material may undergo fission. In some implementations, the second material undergoes neutron activation. In some examples, the second material undergoes neutron activation in a beta decay process. In some implementations, the method also includes, ionizing a plasma with the charged particle.

Another aspect of the disclosure provides a nuclear fuel cell. The nuclear fuel cell includes, a net neutron-producing material defining a thickness T1, a neutron-consuming material, and a neutron-moderating material. The nuclear fuel also includes a cladding surrounding the net neutron-producing material and defining a second thickness T2, where a ratio of the thickness T1 to the thickness T2 is operable to increase a rate of transmission of electrons from an emitter to a collector.

This aspect may include one or more of the following optional features. In some implementations, the net neutron-producing material is fissile. In some examples, the net neutron-producing material is fertile. Optionally, the net neutron-producing material may undergo fission. In some implementations, the neutron-consuming material undergoes neutron activation. In some examples, the neutron-consuming material undergoes neutron activation in a beta decay process.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
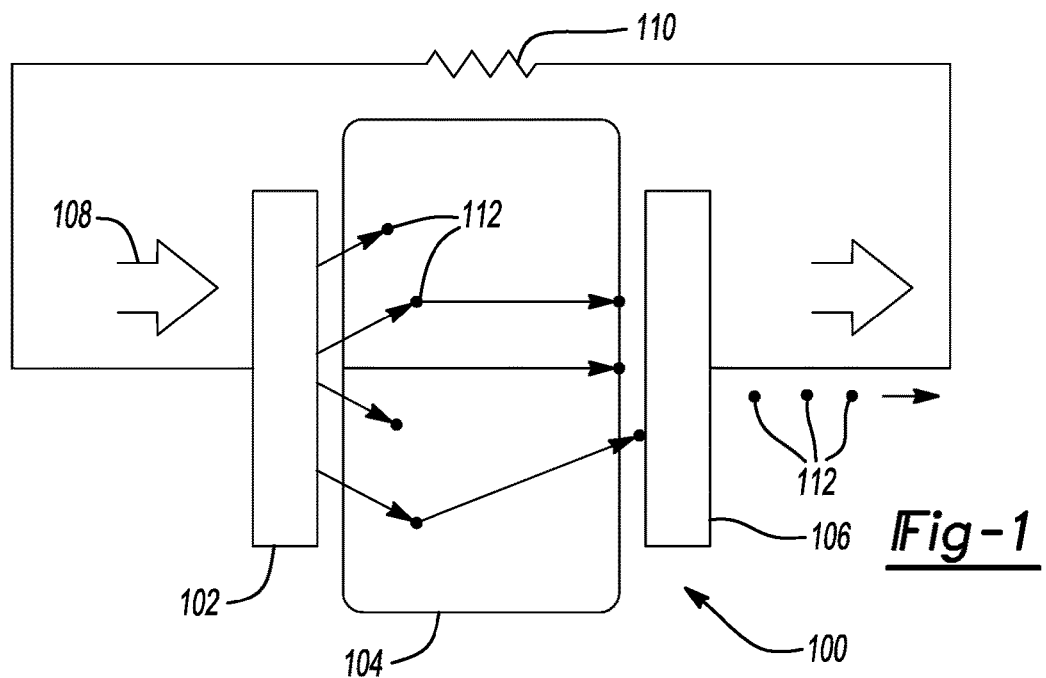
FIG. 1 is a functional block diagram of a prior art thermionic energy conversion system.

As shown in FIG. 1, a thermionic energy conversion system 100 may include an emitter 102, a medium 104, a collector 106, and a heat source 108. As will be described in more detail below, the thermionic energy conversion system 100 converts heat from the heat source 108 directly into electrical energy from thermionic emissions, which can then be used to drive an electrical load 110 by placing a bias voltage across the emitter 102 and collector 106. The bias voltage is proportional to the difference between the respective work functions of the emitter 102 and collector 106. In doing so, the system 100 allows for the elimination of various parts (e.g., a turbine) that would otherwise be required to produce electrical energy in conventional power generation.

As illustrated in FIG. 1, the emitter 102 contains electrons 112. When the emitter 102 is heated by the heat source 108, the emitter 102 emits the electrons 112. The emitted electrons 112 enter the medium 104 between the emitter 102 and the collector 106. If the medium 104 between the emitter 102 and the collector 106 is conductive, an electric current, capable of driving the load 110, is produced.

As the emitter 102 is heated by the heat source 108, the emitter 102 emits electrons 112. The electrons 112 emitted by the emitter 102 enter the medium 104 between the emitter 102 and the collector 106. The negative charge of the electron 112 emitted by the emitter 102 repels other negatively-charged electrons 112. Thus, when the electrons 112 emitted from the emitter 102 enter the medium 104, the negative charge of the electrons 112 repels additional electrons 112 and inhibits and/or prevents such additional electrons 112 from leaving the emitter 102 and reaching the collector 106, creating a space charge which reduces the efficiency of the system 100. In some implementations, a plasma acts as the medium 104 between the emitter 102 and the collector 106. In this regard, the medium 104 may be referred to herein as the "plasma 104." The plasma 104 may mitigate the space charge of the medium 104 allowing electrons 112 to leave the emitter 102 without inhibiting other electrons to also leave the emitter. The plasma 104 may take different forms. For example, in some implementations, the plasma 104 includes a vapor such as cesium vapor.

The efficiency of the system 100 can be increased by reducing the negative space charge with the plasma 104. As the negative space charge is neutralized by the plasma 104, additional electrons 112 are more freely emitted from the emitter 102, thus increasing the current flow through the plasma 104 and, in turn, improving efficiency of the system 100. In this regard, when the plasma 104 is in a natural, pre-ionized state (i.e., a rarified vapor or gas), it may not conduct electrons 112. The plasma 104 may be ionized by coming into contact with the emitter 102, allowing the emitter 102 to transmit the electrons 112 across the plasma 104. In another implementation, the plasma 104 may be ionized by the emitted electron 112 striking a neutral atom of the plasma 104 and ionizing the neutral atom into an additional electron and an ion. The plasma 104 may conduct electrons 112 after the plasma 104 is ionized. When plasma 104 is ionized, electrons 112 are able to conduct from the emitter 102 through the plasma 104 to the collector 106 thereby generating an electrical current. The flow of electrons 112 from the heated emitter 102 to the collector 106 generates electrical energy which may be used to drive the load 110.

Utilizing the electrons 112 to ionize the plasma 104 reduces the total efficiency of the thermionic energy conversion system 100. For example, by ionizing the plasma 104 to allow additional electrons 112 to emit from the emitter 102, electrons 112 expend their energy on ionizing the plasma 104 rather than producing electrical energy, thus decreasing the electrical efficiency of the system 100.

Figure 2:
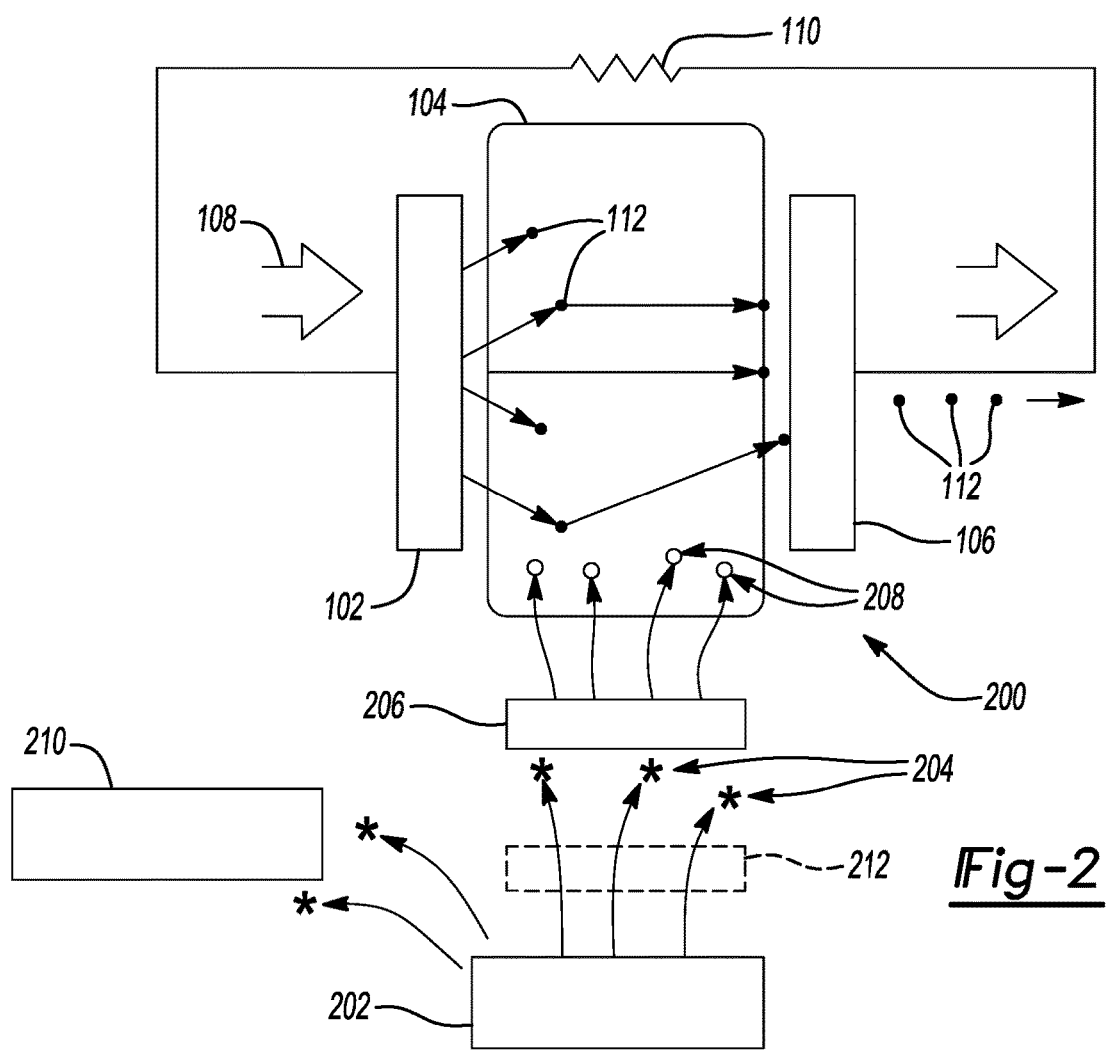
FIG. 2 is a functional block diagram of a thermionic energy conversion system in accordance with the principles of the present disclosure.

A heavy ion thermionic energy conversion (HITEC) system 200 is illustrated in FIG. 2. The HITEC system 200 may be substantially similar to the thermionic energy conversion system 100, except as otherwise shown or described herein. An example method of ionizing plasma 104 in the HITEC system 200 utilizes fission fragments 208. For example, a neutron source 202 produces neutrons 204. The HITEC system 200 may also include a net neutron-producing material 206 that can either be fissile (e.g., U-235)—that is, capable of a fission reaction after absorbing a neutron—or fertile (e.g., U-238)—that is, not capable of undergoing a fission reaction after absorbing a neutron.

When the neutron source 202 produces a neutron that is absorbed by the net neutron-producing material 206 (e.g., U-235) the neutron-producing material 206 becomes unstable splitting into fission fragments 208 and releases several new neutrons in the process. The new neutrons released from the fission process may themselves undergo fission according to the following equation to create additional fission fragments 208 and release neutrons resulting in a chain reaction, where "n" is a neutron 204.

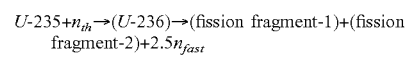

$$U\text{-}235+n_{th}\rightarrow(U\text{-}236)\rightarrow(\text{fission fragment-1})+(\text{fission fragment-2})+2.5n_{fast}$$

The fission fragments 208, generated from the fission process, enter the plasma 104 between the emitter 102 and collector 106 and ionize the plasma 104. The use of fission fragments 208 to ionize the plasma 104 in the HITEC system 200 allows more electrons 112 to flow from the emitter 102 through the plasma 104 to the collector 106. In particular, electrons 112 can solely flow from the emitter 102 to the collector 106 to generate electrical energy, rather than being used to ionize the plasma 104, thereby increasing efficiency of the HITEC system 200.

Utilizing the fission fragments 208 to ionize the plasma 104 causes a build-up of heavy metals in the plasma 104 to occur. In particular, the fission fragments 208, after ionizing the plasma 104, become neutral heavy metal particles within the plasma 104. The build-up of the fission fragments 208 as neutral heavy metal particles in the plasma 104 increases the likelihood that the electrons 112 emitted from the emitter 102 will collide with a neutral heavy metal particle. Electrons 112 that collide with the neutral heavy metal particle from the fission fragment 208 may lose energy due to the collisions, therefore, the electrons 112 produce less electrical energy, reducing the efficiency of the HITEC system 200. In some examples, fission fragments 208 are deposited onto the surface of the emitter 102, causing the emitter to emit fewer electrons 112, and further reducing the overall efficiency of the HITEC system 200 by reducing the amount of electrical energy produced.

As illustrated in FIG. 2, the HITEC system 200 may contain a neutron-consuming material 210 and a neutron-moderating material 212. The neutron-moderating material 212 reduces the velocity of the neutrons 204 released from the neutron-producing material 206. For example, as the neutron source 202 produces neutrons 204 that are absorbed by the neutron-producing material 206 or neutron-consuming material 210, the neutron of the neutron-producing material 206 becomes unstable splitting into fission fragments 208 and may release several new neutrons to stabilize. The released neutrons 204 from fission may travel at a high velocity, resulting in a low likelihood of absorption by the neutron-producing material 206 or neutron consuming material 210.

The neutron-moderating material 212 (e.g., graphite, water, or Zirconium Hydride) reduces the velocity of the fast neutrons 204 produced by fission, thus increasing the likelihood that the released neutrons are absorbed by the neutron-producing material 206 and neutron consuming material 210, which, in turn, can result in the production of more fission fragments 208. As the velocity of more neutrons 204 produced by the fission process is reduced by the neutron-moderating material 212, resulting in the absorption of more neutrons 204 by the neutron-producing material 206 and the production of more fission fragments 208, the HITEC system 200 becomes less dependent on the neutron source 202 to start the fission chain reaction, thus increasing the efficiency of the HITEC system 200.

As illustrated in FIG. 2, the neutron-consuming material 210 absorbs neutrons 204 generated from fission to regulate the reproduction of neutrons in the HITEC system 200. The quantity of neutrons 204 produced by the HITEC system 200 without the neutron-consuming material 210 may cause the system to enter a supercritical state where the number of neutrons 204 produced accelerates at an uncontrolled rate, causing the number of net neutrons in the HITEC system 200 to be higher than is desirable for long term sustainability.

Figure 3:
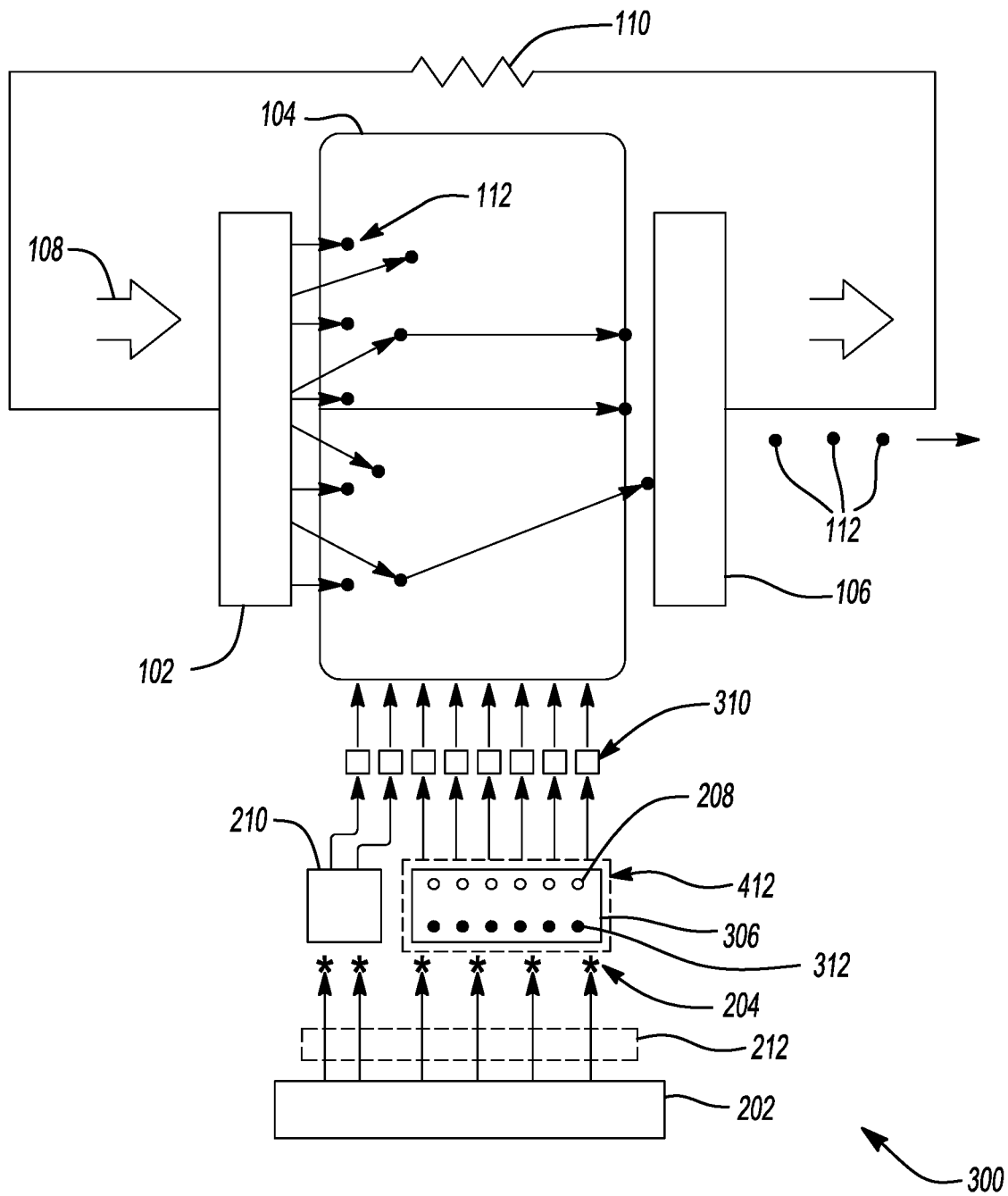
FIG. 3 is a functional block diagram of a thermionic energy conversion system in accordance with the principles of the present disclosure.

Another exemplary HITEC system 300 is illustrated in FIG. 3. The HITEC system 300 may be substantially similar to the HITEC system 200, except as otherwise shown or described herein. The HITEC system 300 may include a neutron-producing material 306, a neutron-consuming material 210 (e.g., a fission-capable material 306), a plasma 104, and beta decay particles 310. The neutron-producing material 306 can either be fissile (e.g., U-235) or fertile (e.g., U-238). In this regard, a fissile neutron-producing material 306 may be capable of a fission reaction after absorbing a neutron 204, while a fertile neutron-producing material 306 may be incapable of undergoing a fission reaction after absorbing a neutron 204.

During operation, the HITEC system 300 uses the neutron source 202 to produce neutrons 204 that may be absorbed by a neutron-producing material 306. After absorbing the neutrons 204, the neutron-producing material 306 may undergo fission. In particular, when the neutron-producing material 306 absorbs the neutron 204 of the neutron-producing material 306 may become unstable, splitting into fission fragments 208 and releasing several new neutrons 204 in the process. In some examples, when the neutron-producing material 306 absorbs the neutron 204, the neutron-producing material 306 produces heavy and/or light fission fragments 208 and several neutrons 204. The released neutrons 204 from the fission process may, in turn, absorb into the neutron-producing material 306 creating additional fission fragments 208 and releasing additional neutrons 204.

As the HITEC system 300 operates, the fission fragments 208 may undergo a beta decay process. In particular, the fission fragment 208 generated by the fission process, undergoes beta decay where the fission fragment 208 converts one of its neutrons 204 into a proton 312 by releasing an additional electron referred to herein as a "beta decay particle 310." The beta decay reaction of the fission fragment 208 can be described by the following equation:

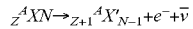

$$_Z^A X_N \rightarrow\ _{Z+1}^A X'_{N-1} + e^- + \bar{\nu}$$

Where X is a parent nucleus, X' is a daughter nucleus, Z is a proton number, N is a neutron number, A is the sum of the proton number and neutron number, $e^-$ is an electron, and $\bar{\nu}$ is an antineutrino.

The beta decay particle 310, released from the beta decay process, enters the plasma 104 between the emitter 102 and the collector 106 and ionizes the plasma 104. The beta decay particle 310 contains a much higher energy than electrons 112 emitted from the emitter 102. The higher energy of the beta decay particle 310 allows the beta decay particle 310 to ionize magnitudes more plasma 104 atoms compared to electrons 112 emitted from the emitter 102, thereby increasing the amount of electricity produced by, and the overall efficiency of, the HITEC system 300. For example, the beta decay particle 310 ionizes the plasma 104 by the process described above, thereby (i) allowing electrons 112 to flow from the emitter 102 through the plasma 104 to the collector 106 and (ii) increasing the efficiency of the HITEC system 300. In this regard, the beta decay particle 310 can ionize the plasma 104 without creating a build-up of neutral heavy metal particles in the plasma 104. In particular, the use of the beta decay particle 310 for ionization from the beta decay process can result in an indirect use of the fission fragments 208 that does not result in the neutral heavy metal particle build up that occurs upon ionization of the plasma 104 using fission fragments 208 during operation of the HITEC system 200 described above relative to FIG. 2.

In some implementations, neutron activation may occur when the neutron 204 is absorbed by the neutron-consuming material 210, causing radioactivity (e.g., alpha decay, beta decay, gamma decay) to occur in the neutron-consuming material 210. In particular, the neutron-consuming material 210 may undergo neutron activation in a beta decay process. When the neutron-consuming material 210 absorbs the neutron 204 the neutron-consuming material 210 undergoes beta decay. Thus, the neutron-consuming material 210, by neutron activation, may produce beta decay particles 310 that enter the plasma 104.

Figure 4:
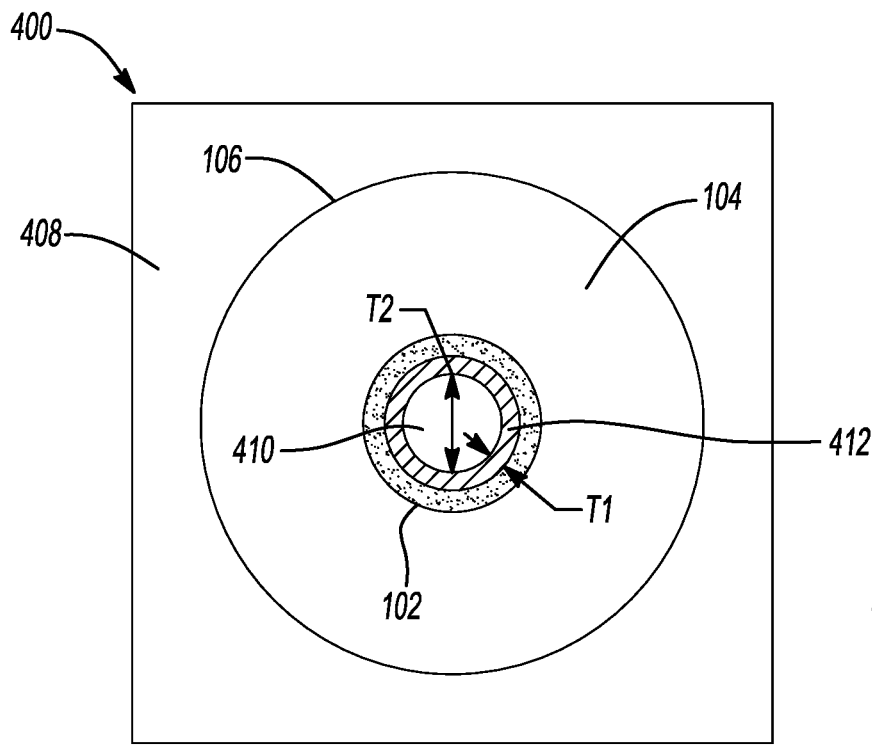
FIG. 4 is a schematic view of a fuel cell utilizing a thermionic energy conversion system in accordance with the principles of the present disclosure.

FIG. 4 illustrates a fuel cell 400 using a HITEC system (e.g., HITEC system 300). The fuel cell 400 may include an emitter 102, a plasma 104, a collector 106, a neutron moderating material 408, and fuel 410. The fuel 410 may include the neutron producing material 306, neutron consuming material 210, and neutron moderating material 408 in a ratio that is capable of converting neutrons into beta decay particles 310 without producing net neutrons. The fuel 410 may include a thin cladding 412 that retains the fission fragments 208 within the fuel 410, while allowing the beta decay particles 310 to escape the fuel 410 and to enter the plasma 104 for ionization. By retaining the fission fragments 208 within the fuel 410, the thin cladding 412 prevents fission fragments 208 from entering the plasma 104 for ionization, thus preventing the previously-described build-up of neutral heavy metal particles, while still allowing beta decay particles 310 to ionize the plasma 104. In some examples, the thin cladding 412 provides an additional safety mechanism to prevent radioactive material (i.e., fission fragments 208) from entering the environment. In some implementations, a thickness T1 of the thin-cladding 412 is less than fifteen microns. In particular, the thickness T1 of the thin cladding may be between ten microns and one hundred microns. In some implementations, the thickness T1 of the thin cladding is substantially equal (+/−ten percent) to ten microns. In particular, the thickness T1 of the cladding 412 may be between 0.25% and 1.25% of a thickness T2 of the fuel 410. In some examples, the thickness T1 of the cladding 412 is between 0.5% and 1% of the thickness T2 of the fuel 410. In this regard, the range of the beta particles 310 may be two to three orders of magnitude greater than the range of the fission fragments 208, such that thin cladding 412 and, in particular, the ratio of the thickness T1 to the thickness T2, allows for the retention of the fission fragments 208 within the fuel element 410 and the release of the beta particles 310 to the plasma 104 for ionization thereof, which, in turn increases the efficiency of the fuel cell 400 and the system 300 relative to the system 200.

The neutron moderating material 408 may include a lightweight material that is also non-absorbing of neutrons (e.g., graphite). As illustrated in FIG. 4, the fuel 410 may be disposed at a central portion of the fuel cell 400. The emitter 102 may be disposed around (e.g., surrounding) the fuel 410. The plasma 104 may be disposed around (e.g., surrounding) the emitter 102, such that the emitter 102 is disposed between the fuel 410 and the plasma 104. The collector 106 may be disposed around (e.g., surrounding) the plasma 104, such that the plasma 104 is disposed between the collector 106 and the emitter 102. The neutron moderating material 408 may be disposed around (e.g., surrounding) the collector 106. The cladding 412 may be disposed around the fuel 410 and between the fuel 410 and the emitter 102.

The fuel cell 400 may generate electrical energy by conducting electrons 112 from the emitter 102 to the collector 106. The plasma 104 may reside between the emitter 102 and collector 106 to act as a conductive medium. In this regard, in order for the plasma 104 to conduct electrons 112, the plasma 104 must be ionized, since plasma 104 in a non-ionized state does not conduct electrons 112 from the emitter 102 to the collector 106. When ionized, the plasma 104 may allow electrons 112 to flow from the emitter 102 to the collector 106.

With reference to FIGS. 3 and 4, the fuel cell 400 may use the HITEC system 300 to ionize the plasma 104. For example, the neutron source 202 may produce neutrons 204 that undergo a fission process, as previously described. The neutron moderating material 408 may reduce the velocity at which the neutrons 204 born from the fission process travel to increase the likelihood that the neutrons 204 undergo additional fission processes, thereby causing a fission chain reaction. The fission process creates fission fragments 208 that further decay to create beta decay particles 310. The beta decay process converts the neutron 204 into a proton 312 by releasing the beta decay particle 310, as previously described. The beta decay particle 310 may then be used to ionize the plasma 104, putting the plasma 104 in the ionized state and, thus, making the plasma 104 a conductive medium for electrons 112 to flow through. Additionally, the fission fragments 208 produce heat for thermionic emission. The heat produced by the fission fragments 208 heats the emitter 102 allowing more electrons 112 to emit from the emitter 102 to the collector 106.

Figure 5:
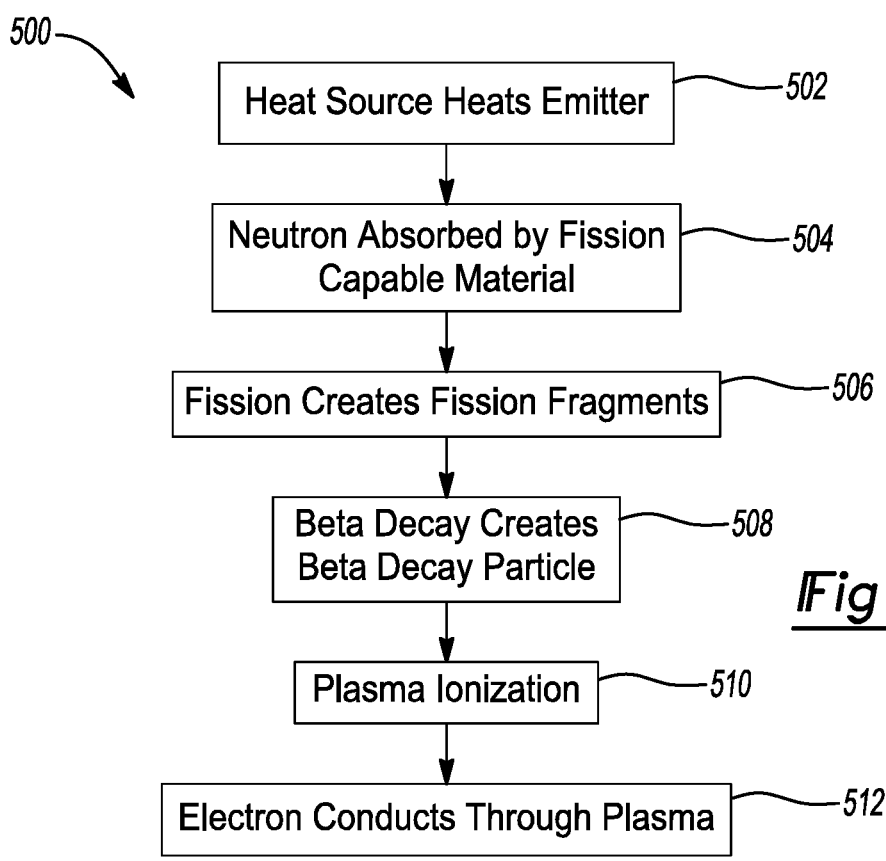
FIG. 5 is a flow diagram of a method of operating the fuel cell of FIG. 4 in accordance with the principles of the present disclosure.

With reference to FIG. 5, a method 500 of HITEC is illustrated. At step 502, the method 500 may include the heat source that heats the emitter 102 to release electrons 112 from the emitter 102 into the plasma 104. In some examples, the heat source includes heat produced by the fission fragments 208. The plasma 104 is in a pre-ionized state not conducting electrons 112 from the emitter 102 to the collector 106. At step 504, the neutron source 202 produces the neutron that is absorbed by the neutron-producing material 206. At step 506, once the neutron-producing material 206 absorbs the neutron, the neutron-producing material 206 becomes unstable splitting into fission fragments 208. At step 508, the fission fragment 208 produced by the fission, beta decays into the proton 312 by releasing the beta decay particle 310. At step 510, the beta decay particle 310 escapes the thin cladding 412 to enter and ionize the plasma 104. The ionization of the plasma 104 by the beta decay particle 310 reduces the negative charge of the plasma 104 allowing additional electrons 112 to emit from the emitter 102 into the plasma 104. At step 512, the emitted electrons 112 from the emitter 102 conduct through the plasma 104 to the collector 106 to generate electrical energy capable of driving the load 110.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A nuclear fuel cell comprising:
   a nuclear fuel unit including:
      a net neutron-producing material;
      a neutron-consuming material; and
      a neutron-moderating material,
   a system including a gas disposed between an electron emitter and an electron collector; and
   a neutron source,
   wherein the nuclear fuel unit is disposed adjacent the neutron source and the system,
   wherein the neutron-producing material is configured to undergo fission upon exposure to neutrons produced by the neutron source to produce fission fragments and neutrons,
   wherein the fission fragments are configured to undergo beta decay,
   wherein electrons from the beta decay are operable to convert the gas in the system into an ionized plasma,
   wherein the neutron-moderating material is configured to moderate fast neutrons produced by the neutron-producing material, and
   wherein the neutron-consuming material is configured to absorb neutrons in regulating neutrons in the nuclear fuel cell.

2. The nuclear fuel cell of claim 1, wherein the net neutron-producing material is fissile.

3. The nuclear fuel cell of claim 1, wherein the neutron-consuming material is configured to undergo neutron activation.

4. The nuclear fuel cell of claim 3, wherein the neutron-consuming material is configured to undergo neutron activation during the beta decay.

5. The nuclear fuel cell of claim 1, wherein a ratio of the net neutron-producing material to the neutron-consuming material is operable to regulate neutrons in the nuclear fuel cell.

* * * * *